US006098930A

United States Patent [19]

Eller et al.

[11] Patent Number: 6,098,930

[45] Date of Patent: Aug. 8, 2000

[54] SOLID-STATE SPACECRAFT WITH MINIMAL MOVING PARTS

[75] Inventors: Howard S. Eller, Redondo Beach; Ramon Coronel, Torrance, both of Calif.

[73] Assignee: TRW Inc., Redondo Beach, Calif.

[21] Appl. No.: 09/123,136

[22] Filed: Jul. 27, 1998

[51] Int. Cl.[7] .............................. B64G 1/10; B64G 1/22

[52] U.S. Cl. .............................. 244/172; 244/158 R

[58] Field of Search .............................. 244/158 R, 172, 244/173, 3.22

[56] References Cited

U.S. PATENT DOCUMENTS

| | | | |
|---|---|---|---|
| 5,386,953 | 2/1995 | Stuart | 244/158 R |
| 5,641,135 | 6/1997 | Stuart et al. | 244/173 |

*Primary Examiner*—Robert P. Swiatek

*Attorney, Agent, or Firm*—Michael S. Yatsko

[57] ABSTRACT

A compact spacecraft (10, 22) having a potentially long life in orbit as a result of its use of non-moving and solid-state components entirely or wherever possible. Amorphous silicon arrays (14, 24, 44) are used for solar energy collection. Because the arrays are not limited to a flat panel configuration, no movement is needed except for possible initial deployment. Phased arrays (12, 26) are used wherever possible for antenna arrays, in combination with torque rods (18, 3) for coarse attitude control of the spacecraft. Avionics modules (30, 50) are fabricated using large wafer-scale techniques and energy storage using long life battery or a solid-state capattery (52) technology. Propulsion is also effected with no moving parts, using waffle propulsion modules (20, 28, 54), which use elemental containers of propellant that is selectively ignited to supply propulsive force. This combination of features extends the useful life of the spacecraft beyond limits imposed primarily by mechanical moving parts, and by high levels of redundancy.

6 Claims, 2 Drawing Sheets

10

14

20

-16-

-18-

12

SOLID-STATE SPACECRAFT WITH MINIMAL MOVING PARTS

BACKGROUND OF THE INVENTION

This invention relates generally to unmanned spacecraft and, more particularly, to spacecraft intended to remain in orbits for extended periods of time, from one to fifteen years or longer. Recent rapid developments in electronics have reduced the size and weight of electronics modules on spacecraft and have concurrently extended the operational lifetimes of these modules. Mechanical subsystems of spacecraft have not, however, kept pace with these improvements in electronics, and can be the limiting factor in overall operational lifetimes of spacecraft. Mechanical subsystems for spacecraft supporting structure, thermal control, attitude control and propulsion, comprise a significant part of any satellite but have not been subject to the same kind of design revolution that electronics has. Consequently, there is a need for an improved spacecraft construction that eliminates or minimizes the use of mechanical subsystems, and provides a more reliable vehicle with longer overall lifetimes.

SUMMARY OF THE INVENTION

The present invention resides in a spacecraft of solid-state design in which moving parts are either eliminated completely or are minimized significantly in comparison to spacecraft of conventional design. Briefly, and in general terms, the spacecraft of the present invention comprises a compact housing structure; at least one phased array antenna; at least one non-moving solar array, typically of amorphous silicon; a solid-state chemical or capacitive (capattery) based energy storage unit; a set of torque rods for attitude control; at least one avionics module employing wafer-scale integration; and multiple waffle propulsion modules with no moving parts. In one of the disclosed embodiments, the housing structure is cylindrical in shape. The amorphous silicon solar array is installed on one end face of the cylindrical housing, the phased array antenna is installed on the other end face of the cylindrical housing, the waffle propulsion modules are installed on the curved and end faces of the cylindrical housing, and the other components are stowed inside the housing.

In another disclosed embodiment of the invention, the housing structure is in the shape of a hollow pyramid. The solar array includes four panels deployable to extend from the based of the pyramid-shaped housing, the phased array antenna and the waffle propulsion modules are installed on at least one sloping face of the pyramid-shaped housing; and the other components are stowed inside the housing.

In a third embodiment of the invention, the spacecraft comprises a cylindrical housing; a navigation and attitude control subsystem mounted in the housing and including micro inertia wheels for attitude control and a star sensor for navigation; at least one avionics module stowed in the housing and including wafer-scale integrated circuitry; a battery/capattery stowed in the housing for energy storage; a non-moving silicon array extending from one end of the cylindrical housing; an antenna subsystem extending from the other end of the cylindrical housing; and multiple waffle propulsion modules mounted on the exterior of the cylindrical housing.

It will be appreciated from the foregoing that the present invention represents a significant advance in the field of spacecraft construction. In particular, the present invention extends the useful life of spacecraft by using solid-state non-moving parts wherever possible. Other aspects and advantages of the invention will become apparent from the following more detailed description, taken in conjunction with the accompanying drawings.

DESCRIPTION OF THE PREFERRED EMBODIMENTS

Figure 1:
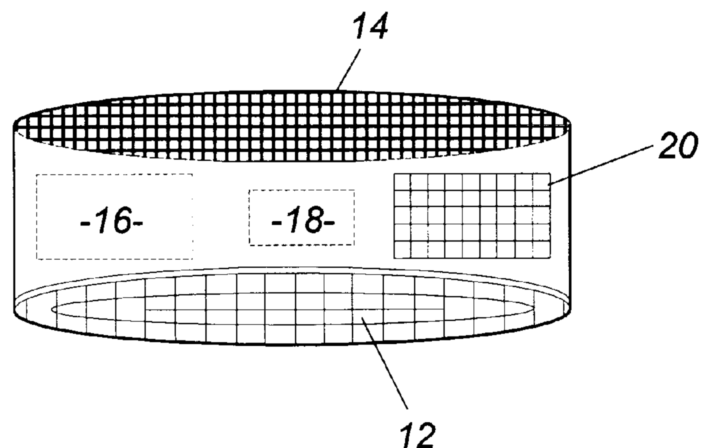
FIG. 1 is diagrammatic view of a first embodiment of the present invention.

As shown in the drawings for purposes of illustration, the present invention pertains to spacecraft with few or no moving mechanical parts. Mechanical components of orbiting spacecraft have not kept up with the dramatic improvements in reliability and useful lifetimes of some electronic components. In accordance with the present invention, mechanical components having moving parts are improved or eliminated, to provide increased reliability and useful life to the spacecraft.

More specifically, in the present invention, the following significant substitutions are made in various combinations: First, steerable dish antennas are replaced by phased array antennas. This avoids the use of deployable parabolic antennas and steering gimbal mechanisms. In phased arrays, antenna beam steering is accomplished by controlling a time or phase delay in each antenna element feed circuit. With appropriate coordination of the individual phase delays, the antenna beam in transmit or receive modes can be steered in three-dimensional space.

Another important change in accordance with the invention is to replace conventional solar arrays with amorphous silicon arrays that are non-movable except for possibly first deployment. Another change is to replace mechanical gyros and inertia wheels used for attitude control with torque rods for the same purpose. Torque rods carry an electric current having an associated magnetic field that interacts with the Earth's magnetic field to produce a torque in a desired direction to change the attitude of the spacecraft.

An optional feature of the spacecraft of the invention is the use of a solid-state capattery instead of a conventional battery for energy storage. Capatteries use capacitive principles to store electric charge, and can be fabricated as solid-state devices.

Avionics modules in the invention are embodied in solid-state components fabricated using wafer-scale technology for economy in manufacture and for compactness in the spacecraft.

Finally, even propulsion subsystems are reduced to non-moving components by use of waffle propulsion modules in which elemental containers of combustable propellant are selectively ignited to provide attitude control and station keeping functions.

Figure 2:
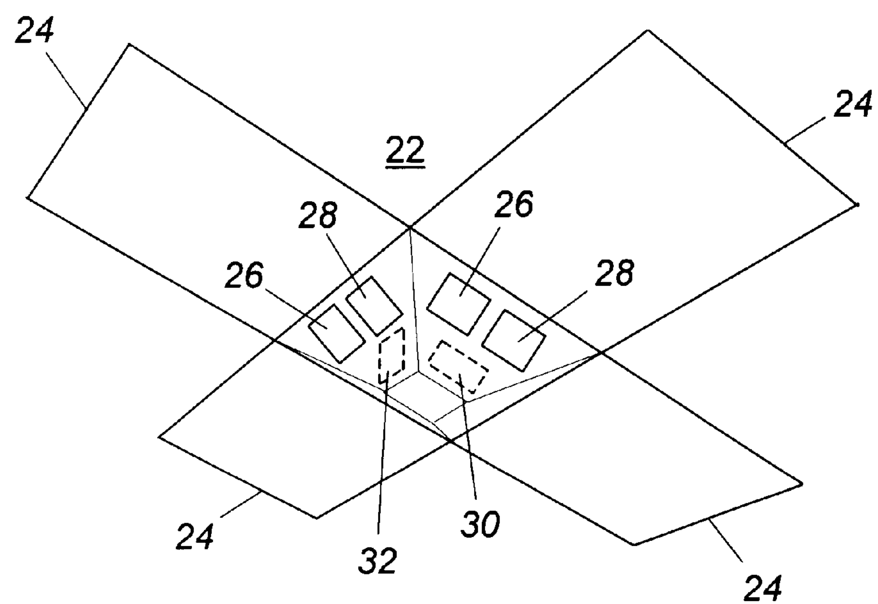
FIG. 2 is a diagrammatic view of a second embodiment of the present invention.
Figure 3:
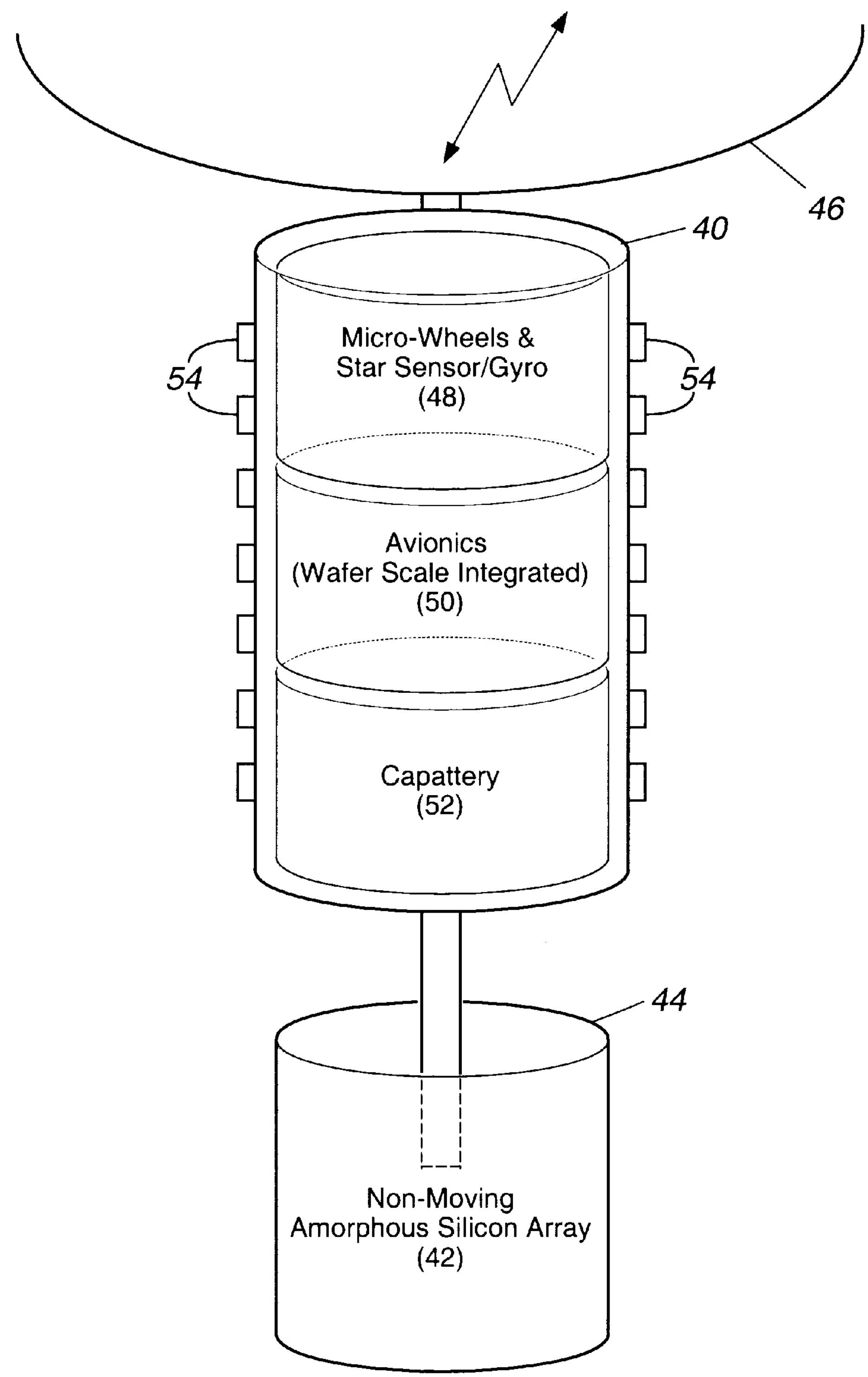
FIG. 3 is a diagrammatic view of a third embodiment of the present invention.

Three illustrative embodiments of the invention are shown in FIGS. 1–3, respectively. In FIG. 1, the spacecraft takes the form of a short cylinder, indicated by reference numeral 10. A phased array 12 of antenna elements is positioned on one end face of the cylinder 10, and the other end face is covered with a solar array 14, typically of amorphous silicon. Avionics modules 16 using wafer-scale electronics, a set of three torque rods 18 and payload modules (not specifically shown) are housed within the cylinder 10. Waffle propulsion panels, only one of which is indicated, by reference numeral 20, are arrayed around the outer wall of the cylinder 10 and one of its end faces, to provide propulsion in all three dimensions.

The embodiment of FIG. 2 takes the form of a truncated pyramid 22 on a generally square base. Four solar panels 24 extend from the base of the pyramid 22 and have to be deployed on first use, but no further movement is required. The panels 24 use amorphous silicon sheets that can be easily stowed inside the pyramid prior to deployment. Phased antenna arrays 26 and waffle propulsion panels 28 are mounted on the sloping sides of the pyramid, either inside or outside, and avionics 30 and torque rod 32 modules are mounted inside the pyramid with other equipment.

FIG. 3 shows yet another embodiment of the invention, in which the spacecraft takes the form of a cylinder 40 about the size of a coffee can. Extending from end of the cylinder 40 is a non-moving amorphous silicon array 42 mounted on another cylinder 44 of about the same size as the main cylinder 40. At the other end of the cylinder 40 is a deployable antenna reflector 46, but it will be appreciated that a phased array antenna could be substituted. Inside the cylinder 40 are an attitude control subsystem 48 employing micro-wheels and a conventional star sensor and gyro, a wafer-scale avionics module 50 and a capattery 52 for energy storage. Disposed on the outside of the cylinder 40 are multiple waffle propulsion panels 54.

It will be appreciated from the foregoing that the present invention represents a significant advance in spacecraft design. In particular, the invention is embodied in a spacecraft having few or no moving mechanical parts. Among the advantages of the spacecraft are that its components are easy to integrate into one structure, it has a low alignment requirement using only torque rods, it lends itself to low-cost mass production, it has a small stowage volume for launch, and it has a potentially long life in orbit. Moreover, the spacecraft of the invention is inherently very reliable, simple in design, and is likely to degrade "gracefully" at the end of its useful life.

It will also be appreciated that, although three illustrative embodiments of the invention have been described in detail, various modifications may be made without departing from the spirit and scope of the invention. Therefore, the invention should not be limited except as by the appended claims.

What is claimed is:

1. A solid-state spacecraft with minimal moving parts, the spacecraft comprising:

a compact housing structure;

at least one phased array antenna;

at least one non-moving solar array of amorphous silicon;

means for storing energy, including a solid-state capattery;

a set of torque rods for attitude control;

at least one avionics module employing wafer-scale integration; and multiple waffle propulsion modules with no moving parts.

2. A solid-state spacecraft as defined in claim 1, wherein:

the housing structure is cylindrical in shape;

the amorphous silicon solar array is installed on one end face of the cylindrical housing;

the phased array antenna is installed on the other end face of the cylindrical housing;

the waffle propulsion modules are installed on the curved and end faces of the cylindrical housing; and the means for storing energy, the torque rods and the avionics module are stowed inside the housing.

3. A solid-state spacecraft with minimal moving parts, the spacecraft comprising:

a compact housing structure;

at least one phased array antenna;

at least one non-moving solar array of amorphous silicon;

means for storing energy;

a set of torque rods for attitude control;

at least one avionics module employing wafer-scale integration; and multiple waffle propulsion modules with no moving parts;

and wherein:

the housing structure is in the shape of a hollow pyramid;

the at least one non-moving solar array includes four panels deployable to extend from the base of the pyramid-shaped housing;

the phased array antenna and the waffle propulsion modules are installed on at least one sloping face of the pyramid-shaped housing; and the means for storing energy, the torque rods and the avionics module are stowed inside the housing.

4. A solid-state spacecraft with minimal moving parts, the spacecraft comprising:

a cylindrical housing;

a navigation and attitude control subsystem mounted in the housing and including means for attitude control and a star sensor for navigation;

at least one avionics module stowed in the housing and including wafer-scale integrated circuitry;

an energy storage unit, including a capattery stowed in the housing for energy storage;

a non-moving silicon array extending from one end of the cylindrical housing;

an antenna subsystem extending from the other end of the cylindrical housing; and multiple waffle propulsion modules mounted on the exterior of the cylindrical housing.

5. The spacecraft according to claim 4 wherein said means for attitude control comprises micro inertia wheels.

6. The spacecraft according to claim 4 wherein said means for attitude control comprises fluid loops.

* * * * *